(12) United States Patent
Homewood (10) Patent No.: US 7,373,458 B2
(45) Date of Patent: May 13, 2008

(54) CACHE MEMORY SYSTEM WITH MULTIPLE PORTS CACHE MEMORIES CAPABLE OF RECEIVING TAGGED AND UNTAGGED REQUESTS

(76) Inventor: Mark Owen Homewood, Cherry Cottage, Hale Coombe, Winscomb, North Somerset BS25 1NH (GB)

( * ) Notice: Subject to any disclaimer, the term of this patent is extended or adjusted under 35 U.S.C. 154(b) by 400 days.

(21) Appl. No.: 10/864,916

(22) Filed: Jun. 9, 2004

(65) Prior Publication Data
US 2004/0268048 A1   Dec. 30, 2004

(30) Foreign Application Priority Data
Jun. 12, 2003   (EP)   ................... 03253710

(51) Int. Cl.
*G06F 12/00* (2006.01)
(52) U.S. Cl. .................. 711/120; 711/119; 709/213
(58) Field of Classification Search .................. 711/120
See application file for complete search history.

(56) References Cited

U.S. PATENT DOCUMENTS

| | | | | |
|---|---|---|---|---|
| 5,924,119 | A * | 7/1999 | Sindhu et al. ............... | 711/141 |
| 6,078,992 | A * | 6/2000 | Hum ........................... | 711/122 |
| 6,792,507 | B2 * | 9/2004 | Chiou et al. ................. | 711/119 |
| 2002/0069326 | A1 * | 6/2002 | Richardson et al. ........ | 711/122 |
| 2002/0188805 | A1 * | 12/2002 | Kottapalli ................... | 711/119 |
| 2003/0126365 | A1 * | 7/2003 | Jamil et al. ................. | 711/120 |
| 2003/0204676 | A1 * | 10/2003 | Hotta et al. ................. | 711/137 |

OTHER PUBLICATIONS

Partial European Search Report from European Patent Application 03253710.2, filed Jun. 12, 2003.
McNairy C., et al. "Itanium 2 Processor Microarchitecture" IEEE Micro, IEEE Inc. New York, US, vol. 23, No. 2, Mar. 2003 pp. 44-55, XP001163979 ISSN: 0272-1732.
Juan T. et al. "Data Caches For Superscalar Processors" Proceedings of the 1997 International Conference On Supercomputing. Vienna, Jul. 7-11, 1997, Proceedings Of The International Conference On Supercomputing, New York, ACM, US, vol. CONF. 11, Jul. 7, 1997, pp. 6-67, XP000755241 ISBN: 0-89791-902-5.
Faraboschi P. et al. "LX: A Technology Platform For Customizable VLIW Embedded Processing" Computer Architecture News, Association For Computing Machinery, New York, US, vol. 28, No. 2, May 2000, pp. 203-213, XP000928729 ISSN: 0163-5964.

* cited by examiner

*Primary Examiner*—Donald Sparks
*Assistant Examiner*—Hashem Farrokh
(74) *Attorney, Agent, or Firm*—Lisa K. Jorgenson; James H. Morris; Wolf, Greenfield & Sacks, P.C.

(57) ABSTRACT

There is described a cache memory system including a first cache memory and a second cache memory. A first port is arranged to receive a request for a first item and determine whether the first item is in the first cache memory. A second port is arranged to receive a request for a second item and determine whether the second item is in the second cache memory. The system is arranged such that if the second item is determined not to be in the second cache memory, a request for the second item is sent to the first port. There is also described a method of accessing multiple items from a memory which has associated with it a first cache memory having a first port and a second cache memory having a second port.

52 Claims, 4 Drawing Sheets

CACHE MEMORY SYSTEM WITH MULTIPLE PORTS CACHE MEMORIES CAPABLE OF RECEIVING TAGGED AND UNTAGGED REQUESTS

BACKGROUND OF THE INVENTION

1. Field of the Invention

The present invention relates to a cache memory system and a method of accessing multiple items from a memory, particularly a memory which has cache memories associated with it.

2. Discussion of the Related Art

It is known in the art to provide a cache memory as a level of memory hierarchy between a central processing unit CPU or other main processor or memory master, and a main memory (or other memory-mapped device). A cache memory duplicates commonly-used locations in a main memory for the purpose of speeding up accesses to these locations. In general it stores the most recently used instructions or data from the larger but slower main memory. This means that when the CPU wishes to access data or instructions, the access request can be made to the cache instead of to the main memory. This takes far less time than an access to a main memory, thus the CPU can read or write data more quickly and consequently runs more efficiently than if a cache memory were not used. The cache also updates the main memory with the duplicated locations when required, explicitly or implicitly.

Since computer programs frequently use a subset of instructions or data repeatedly, the cache is a cost effective method of enhancing the memory system in a "statistical" method, without having to resort to the expense of making all of the memory system faster.

The cache is usually smaller than the main memory, which means that it cannot provide a duplicate of every location. Therefore, when an access request in the form of an address is made to the cache, it needs to determine if that particular location currently being requested is one of those duplicated locally or whether it needs to be fetched from the main memory, i.e. it performs a "tag compare" to see if that item is present in the cache. If the location is already stored in the cache, the access is termed a "hit" and if it is not it is termed a "miss". The determining of whether an access is a hit or a miss takes an amount of time, $t_{hit}$. This time is normally the main factor in the amount of time that the cache takes to return a frequently used location and since speed is the purpose of such operations, this is designed to be as short as possible.

If the item is present ("hit") it is returned quickly to the requesting CPU or the like. If however the item is not found ("miss") then it is fetched from the main memory and may be stored into the cache.

As a result of processor performance requirements it is now not uncommon for processors (or the like) to execute more than one operation per cycle and as a result, it is often the case that more than one item is required to be read from main memory during a clock cycle. Consequently multiple accesses need to be made to the cache memory during one clock cycle in order to supply data and/or instructions at the rate required by the program that the processor is running. Clearly this is not possible if a single cache memory with a single port is used.

One known solution is for a cache memory to have multiple ports to the same data. Thus, each time an item is required, it can be looked for simultaneously at each port. The provision of multiple ports also allows several items to be looked for simultaneously in the cache memory. One problem with this solution is that significantly more memory space is required than in the multiple-cache system, leading to greater manufacturing expense and operating power.

Another known solution is to use multiple cache memories, each with their own port. This does allow large quantities of data and/or instructions to be accessed at the same time. However, one problem with such a system is that it is necessary to know from which cache memory to access particular items. This is achieved in the coding of the program being run, which means that the coding is far more complicated than it would otherwise be. Furthermore, the coding necessarily needs to be system-specific because the extra code to deal with the access requirements needs to be based on the structure of the cache memory system being accessed. Another problem is that of aliasing i.e. the same item appearing in more than one cache memory. The aliasing problem is of concern when it comes to writing back to the main memory and is complicated to solve since the cache memories are distinct from one another.

It would therefore be desirable to provide means for allowing multiple accesses to a cache which minimizes special coding requirements and is not system-specific. It would further be desirable to achieve such a system without significantly increasing cache memory size and which would also deal with aliasing.

SUMMARY OF THE INVENTION

According to a first aspect of the invention, there is provided a cache memory system, comprising: a first cache memory; a second cache memory; a first port arranged to receive a request for a first item and determine whether the first item is in the first cache memory; and a second port arranged to receive a request for a second item and determine whether the second item is in the second cache memory, wherein the system is arranged such that if the second item is determined not to be in the second cache memory, a request for the second item is sent to the first port.

According to a second aspect of the invention, there is provided a method of accessing multiple items from a memory which has associated with it a first cache memory having a first port and a second cache memory having a second port, the method comprising the steps of: receiving a request for a first item at the first port; determining whether the first item is in the first cache memory; receiving a request for a second item at the second port; determining whether the second item is in the second cache memory; and if the second item is determined not to be in the second cache memory, sending request for the first item to the first port.

An item can be a data item or an instruction or any other item that can be stored in and retrieved from a memory. An item can be of different types (i.e. signed or unsigned) or sizes (i.e. byte, half word, word).

A request can be a request for retrieval of an item from a cache memory or a request to write to a cache memory.

BRIEF DESCRIPTION OF THE DRAWINGS

Embodiments of the invention will now be described, by way of example only, with reference to the accompanying drawings in which.

DETAILED DESCRIPTION

In the Figures, like reference numerals indicate like parts.

Figure 1:
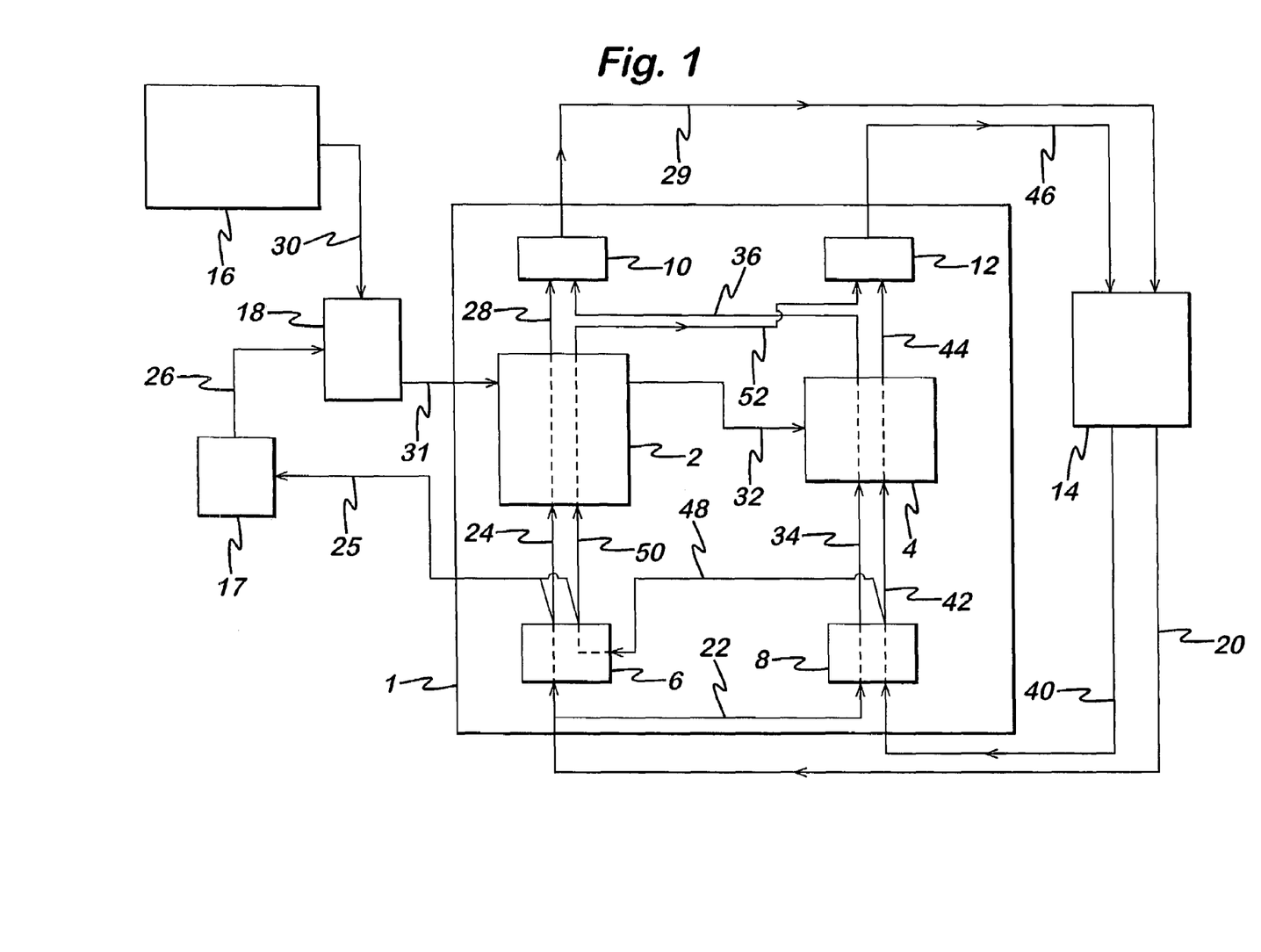
FIG. 1 is a schematic block diagram of one embodiment of the invention.

Referring first to FIG. 1, there is shown a cache memory system 1 in accordance with a first embodiment of the invention. The system comprises a primary cache memory 2 and a secondary cache memory 4. There are a first tag memory 6 and a second tag memory 8, which form part of first and second ports respectively, through which accesses to the cache memories 2, 4 are made. There are first and second output latches 10, 12, through which items are sent out of the cache memories 2, 4. The first port is read-write and the second port is read-only.

There are also shown in FIG. 1 a main memory 16, a refill unit 18 arranged to refill the cache memory 2 with items from the main memory 16, and a stall controller 17, connected to operate when an item is not found in the cache memory 2, as will be described below. An execution unit 14 requests and receives items from the cache memories 2, 4.

Only the primary cache memory 2 is filled from the main memory 16. The secondary cache memory 4 is filled from the primary cache memory 2. The system works on the basis that each time an item is fetched from the main memory 16 into the primary cache memory 2 (having been requested by the execution unit 14 and not already found in the cache memory 2), adjacent items in contiguous blocks are pre-fetched simultaneously. Typically, if 32 bits of data have been requested by the execution unit, 128 bits are actually fetched and the extra bits stored. This means that the requested item is stored in the primary cache memory 2, and the pre-fetched items are also stored in the primary cache memory 2 in anticipation of being required. From here they can be passed to the secondary cache memory 4 as will be explained below. This principle is useful because it is often the case that if an item is required during execution of a program, adjacent items will be required too. Furthermore, with respect to instructions, multiple instructions are very often contiguous.

The secondary cache memory 4 is a read-only cache. This is so as to avoid aliasing between the primary and secondary caches 2, 4. It is also fully-associative with the main memory 16, thus allowing maximum flexibility for storing any data or instructions from the main memory 16 therein.

Let us take the situation where the execution unit 14 is running a program and it reaches an instruction requiring the first item of a block of data or instructions. The block diagram of FIG. 2, which starts at this situation, is referred to in conjunction with FIG. 1.

Figure 2:
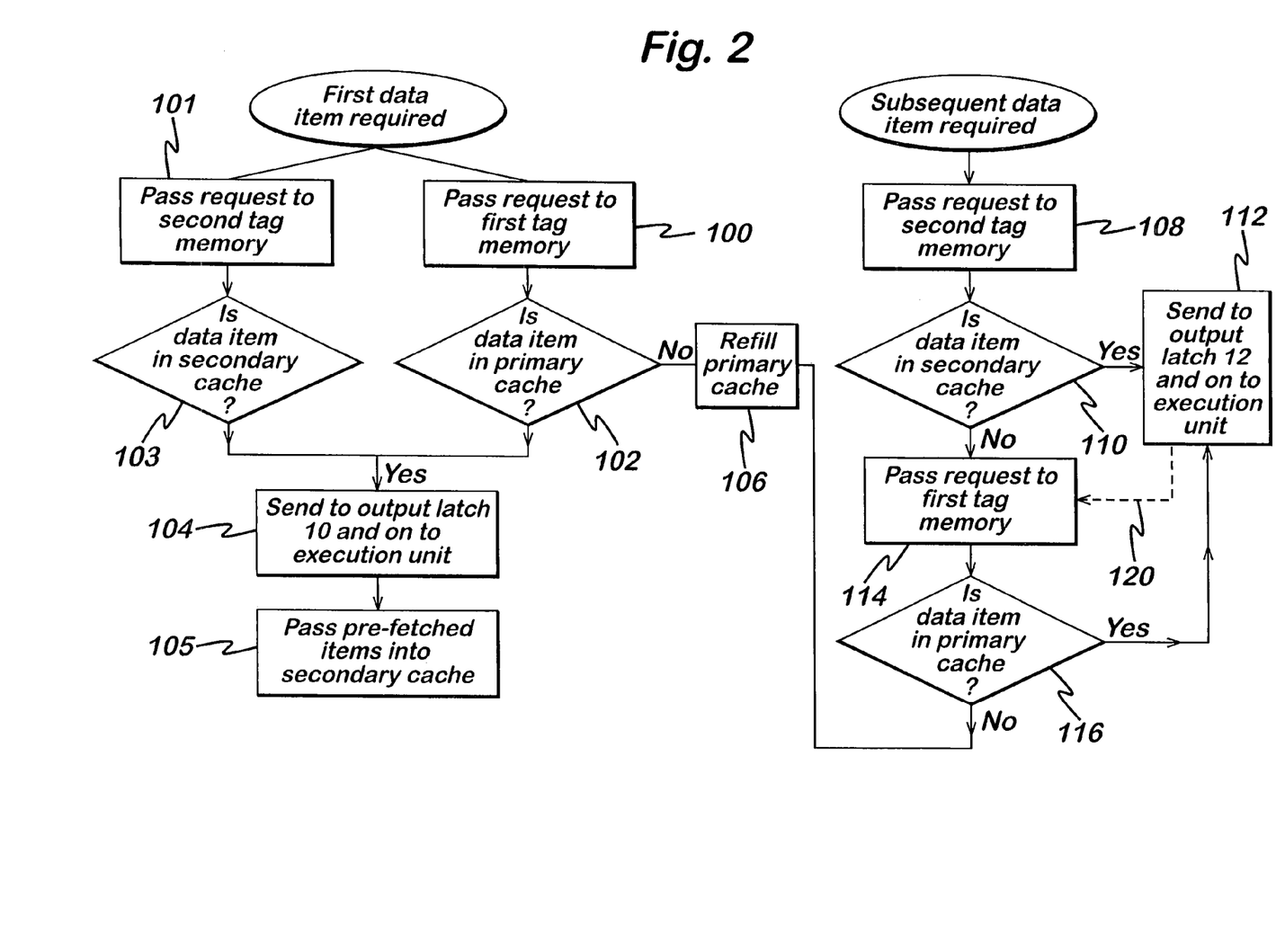
FIG. 2 is a flow chart showing steps involved in the embodiment shown in FIG. 1.

A request for the item is sent from the execution unit 14 (arrow 20). This request for the first item is passed to the first tag memory 6 (step 100), which performs a tag compare with the entries in the primary cache 2 (step 102).

If the request is a hit, the request is passed into the primary cache 2 (arrow 24) from where the item is taken and sent out to the first output latch 10 (arrow 28). From the output latch 10, the item is routed to the execution unit 14 (arrow 29). This part of the process is step 104 in FIG. 2.

As mentioned previously, when an item is fetched from the main memory 16, adjacent items are pre-fetched in anticipation of being required. Thus, in this embodiment, step 105 is then executed to transfer previously pre-fetched blocks of data contiguous to the first item into the secondary cache.

If the request is a miss, the request is passed to the stall controller 17 (arrow 25). The stall controller 17 then initiates a refill of the primary cache 2 to the refill engine 18 (arrow 26). The item that was not found in the primary cache 2 is retrieved from the main memory 16 by the refill engine 18 (arrow 30) and passed to the primary cache 2 (arrow 31). Thus the primary cache is refilled (step 106). As explained previously, adjacent blocks of data will also be pre-fetched and stored in the primary cache for passing onto the secondary cache when the item is later retrieved from the primary cache.

The stall controller 20 also holds further requests from the execution unit during refill of the primary cache 2.

It can be seen that at step 101 in FIG. 2, the request from the execution unit 14 as shown by arrow 20, is also duplicated to the second tag memory 8, as shown by arrow 22. The tag memory 8 also performs a tag compare, but it does so with entries in the secondary cache 4. Thus it is also determined whether the item is in the secondary cache 4 (step 103 in FIG. 2). This step is possible in this embodiment because the secondary cache is dual-ported. However, it is not necessary for the secondary cache to be dual-ported and if it is single-ported, this step is omitted. The system operates well without this step because the execution unit 14 is aware whether it requires the first item of a block or subsequent items and hence is able to direct its request to the first tag memory 6 or the second tag memory 8 as appropriate. The provision of the tag memory 8 being dual-ported is a back-up measure to maintain speed of data retrieval in the event that the execution unit has looked for an item in the wrong cache memory.

In this embodiment the tag compare carried out by the first tag memory 6 with the primary cache 2 and the tag compare carried out by the second tag memory 8 with the secondary cache 4 happen simultaneously i.e. on the same clock pulse. This is efficient because if the item is in either of the primary or the secondary caches, it will be found in the least possible time. However, it is not essential for the two steps to be absolutely simultaneous.

If the tag compare by the tag memory 8 is a hit, the request is passed onto the secondary cache 4, as represented by the arrow 34. The item is retrieved from the cache memory 4 and sent via the output latch 10 (arrow 36) to the execution unit 14. Thus step 104 can also be achieved by this route.

If, on the other hand, the request is a miss, there are one of two scenarios. Either, the item will have been simultaneously located in the primary cache 2 and will subsequently be routed to the execution unit 14 as previously described, or, the item will also not have been found in the primary cache 2. In this latter case, a refill of the primary cache 2 is carried out, as previously described.

Regardless of whether the secondary cache 4 is dual-ported as per the previous four paragraphs, as soon as data or instructions are used from the secondary cache, they are marked for replacement. The secondary cache 4 anyway operates such that the oldest items are overwritten first when the cache is refilled.

Certain items are more likely to be in the secondary cache 4 than in the primary cache 2, in particular, sequential items to a previously-used item. This is because such items will have been pre-fetched when the previous item was used from the primary cache. Other items likely to be in the secondary cache 4 are previously-requested items. The procedure for retrieving items from the secondary cache 4 will now be described. This procedure can operate simultaneously with the procedure described above for retrieval of an item from the primary cache 2 because each of the cache memories 2, 4 has its own respective tag memory 6, 8. If the second tag memory 8 is dual-ported, this procedure can operate simultaneously with retrieval of an item from the primary cache 2 and the simultaneous checking for that item in the secondary cache in accordance with step 101.

The execution unit 14 sends out a request for such an item. This item will be referred to as a "subsequent item", although in some circumstances it may not be related to any previous items. The execution unit sends the request to the secondary cache 4 because it knows it is more likely to be in the secondary cache 4 for the reasons explained in the previous paragraph. The request is represented by the arrow 40 in FIG. 1. The request is passed to the second tag memory 8 (step 108 in FIG. 2).

The second tag memory 8 then performs a tag compare with the secondary cache 4 to determine whether the subsequent item is in the secondary cache 4 (step 110).

If the request is a hit, the request is passed to the secondary cache 4 (arrow 42), from where the subsequent item is retrieved and sent to the second output latch 12 (arrow 44). From there, the subsequent item is passed to the execution unit 14 (arrow 46). Thus step 112 is achieved.

If, on the other hand, the request is a miss, during the next clock cycle, the request is passed across from the second tag memory 8 to the first tag memory 6, as shown by the arrow 48 (step 114). The first tag memory 6 then performs a tag compare with the primary cache 2 (step 116). If the result of this tag compare is a hit, the subsequent item is retrieved from the primary cache 2, as shown by the arrow 50 and routed to the second output latch 12, as represented by the arrow 52. From here, the subsequent item is sent to the execution unit 14, again shown by the arrow 46. Thus step 112 can also be achieved in this manner.

If the result of this tag compare with the primary cache 2 is a miss, a refill of the primary cache 2 is initiated and carried out, as previously described. Thus step 106 can also be initiated and achieved by this sequence of steps.

It can now be understood that the system 1 essentially operates as if there were two dual-ported caches, but memory space and power are saved by the use of cross-coupling between the primary and secondary caches. In other words, an item can be looked for in the primary cache 2 whilst simultaneously looking for a "subsequent" item in the secondary cache 4. (The "subsequent item" is usually not associated with the said item but is associated with an item previously fetched from the primary cache 2 and pre-fetched from the main memory with that item). If the subsequent item is not found in the secondary cache 4, the request is passed to the first tag memory 6, which then looks to see if the subsequent item is in the primary cache 2. Thus the need for the tag memories 6, 8 to be dual-ported is avoided. Since the execution unit 14 has a reasonable idea as to whether a particular item is likely to be in the primary cache 2 or the secondary cache 4, this embodiment is faster than a single-cache system from which only one item can be fetched at a time. The memory system 1 of the embodiment is also around 80% smaller in terms of chip space than if both the first and second caches 2, 4 were dual-ported.

Furthermore, in the case of the secondary cache 4 being dual-ported, the said item can be looked for in the primary cache 2, simultaneously to the two above-mentioned steps, thus providing an even greater speed saving.

It should also be noted that regardless of which "route" is used to retrieve items first requested from the second port through the second tag memory (i.e. by the arrow 40 in FIG. 1 and in accordance with step 108 in FIG. 2 or by subsequent passing to the first cache memory as shown by the arrow 48 and in accordance with step 114), the item is always sent out of the second output latch 12, regardless of whether it is found in the secondary cache 4 or in the primary cache 2. Similarly, any request passed to the first tag memory 6 (as shown by the arrow 20 and in accordance with step 100) is always sent out of the first output latch 10. In the case of the secondary cache 4 being dual-ported, any request first applied to the primary port through the first tag memory 6 by step 100 (and hence to the secondary port through the second tag memory 8 by step 101) is always sent out of the first output latch 10. Thus the processes involved in locating the items in question are invisible to the execution unit 14.

Efficiency of the system can be improved by determining when the program is compiled which items are likely to be in the primary cache 2 and which are likely to be in the secondary cache 4, and marking them such that if they are likely to be in the secondary cache 4, a request for them is sent in accordance with step 108, rather than with step 101. However, due to the cross-coupling provision, any incorrect marking of requests is allowed for.

The above description has discussed the situation when items are being read from the primary cache 2 and the secondary cache 4 for sending out of the output latches 10, 12. However, the principles of operation described are equally applicable to the situation when the request is to write to the primary cache 2. As previously mentioned, only the first port associated with the primary cache 2 is a write port. Before a write is made to the primary cache 2, the item to be written must be checked for in order to avoid aliasing. Thus the procedure follows the steps 108 and 110 to firstly check whether the item is in the second cache memory 4, in accordance with the arrow 40 in FIG. 1.

If the answer to step 110 is no i.e. the item is not found in the secondary cache, the request is then passed to the primary cache 2 as shown by arrow 48 in FIG. 1 and by step 114. If the item is found in the primary cache it can be updated. If the item is not found, it can be written into the primary cache.

If the answer to step 110 is yes i.e. the item is found in the secondary cache, instead of sending the item to the output latch 12, the item is deleted. The request is then passed to the primary cache 2 as shown by the arrow 48. This is slightly different from the read procedure in which if the item is found in the secondary cache, there is no need to pass the request onto the primary cache. This step is shown as a dotted line 120 in FIG. 2. Thus step 110 is then carried out as explained in the previous paragraph.

A second embodiment of the invention will now be described with reference to FIG. 3, which shows a modified system 1'. The layout of the system 1' is the same as that of the system 1 except there is no refill from the primary cache 2 to the secondary cache 4 (as shown by arrow 32 in FIG. 1). This is because this embodiment allows a greater certainty as to which items should be in which cache so such a refill is not required. It could of course be used as a back-up if desired. For the same reason, the arrow 22 is omitted and the tag memory 8 is single-ported. Due to the greater certainty as to which items are in which cache, the back-up of having the tag memory 8 dual ported is not necessary and is outweighed by the chip space saving of it being single-ported. The secondary cache 4 could of course be dual-ported if desired. As in the first embodiment, the second port associated with the secondary cache 4 is read only and the first port associated with the primary cache 2 is read-write.

Consequently, the secondary cache 4 has its own refill engine 19, which enables it to be refilled directly from the main memory 16. It would be possible to use a single refill engine arranged to refill both the cache memories 2, 4.

In this embodiment, the lines in the secondary cache 4 are shorter than those in the primary cache 2 to avoid overhead. This may be useful since there is greater certainty that lines of data or instructions in the main memory 16 will be pre-fetched for storage in the secondary cache 2 and have a different usage pattern.

The greater certainty as to where to look for what items is achieved using hint bits in the program code. These hint bits can be added either manually or automatically via the code generator of the compiler. For example, a pragma in the coding will be translated into a hint bit by the compiler. Hint bits take the form of tags on parts of the code that direct the program to request items from the secondary cache 4. Thus if a tag is found, access is directed to the second tag memory 8 but if no tag is found, access is directed to the first tag memory 6. The vica versa would work equally well.

One type of data which is particularly suitable for tagging is coefficients. For example, in a calculation such as applying a Fourier transform, the coefficients are re-used. Such coefficients could be detected by the compiler and tagged.

Due to the use of hint bits, the likelihood of aliasing is reduced over that of the first embodiment. The system is still flexible in that either the primary or the secondary cache can hold any given bit of data or instructions.

The system 1' operates in a similar manner to the system 1, except with respect to refilling of the secondary cache 4. Referring now to FIG. 4, a flowchart of the operation of the second embodiment is shown. The FIG. 3 and the flowchart of FIG. 4 are similar to the FIG. 1 and the flowchart of FIG. 2 but there are some differences.

The first difference is that the cache memory 4 is not dual-ported so the arrow 22 is not present, and the arrows 34 and 36 which represented duplication of a request to the first tag memory 6 to the second tag memory 8 and being found in the second tag memory 4 (steps 101 and 103 in FIG. 2) are also not present. Thus the arrow 36 from the secondary cache 4 to the first output latch 10 is also not required.

The second difference is that the starting point of one side of the flowchart (that shown on the right hand side) is that a "tagged" item is required. This reflects the greater certainty that a particular item is in the secondary cache due to tagging in the code rather than "second guessing" that an adjacent or "subsequent" item will be required and will have been pre-fetched and stored in the secondary cache 4. The two caches are preferably mutually exclusive, i.e. values in the primary cache cannot have copies in the secondary cache and vice versa.

The third difference is that there is an extra step 118 of refilling the secondary cache 4, which occurs if the answer to the question 116 is no. In other words, a refill of the secondary cache 4 occurs following a request for an item from the secondary cache 4 which was directed from the execution unit 14 to the second tag memory 8, as represented by the arrow 40. If this request is a miss, the request is then passed to the first tag memory 6, as previously described (arrow 48, step 108). If this also produces a miss, in both embodiments a refill of the primary cache 2 is triggered (arrow 25 and step 106). It is at this time in the second embodiment that a refill into the secondary cache 4 is also triggered. This is because the item in question was expected to be in the secondary cache 4 so it is logical to refill the secondary cache 4 with that item so that the hint bits are still useable by the execution unit 14. It is likely that adjacent items to that item will be fetched at the same time and also stored in the secondary cache 4.

The fourth difference is that the step 105 of passing pre-fetched items from the primary cache 2 into the secondary cache 4 is omitted since the secondary cache 4 is not refilled from the primary cache 2 but is refilled directly, as explained above.

Figure 3:
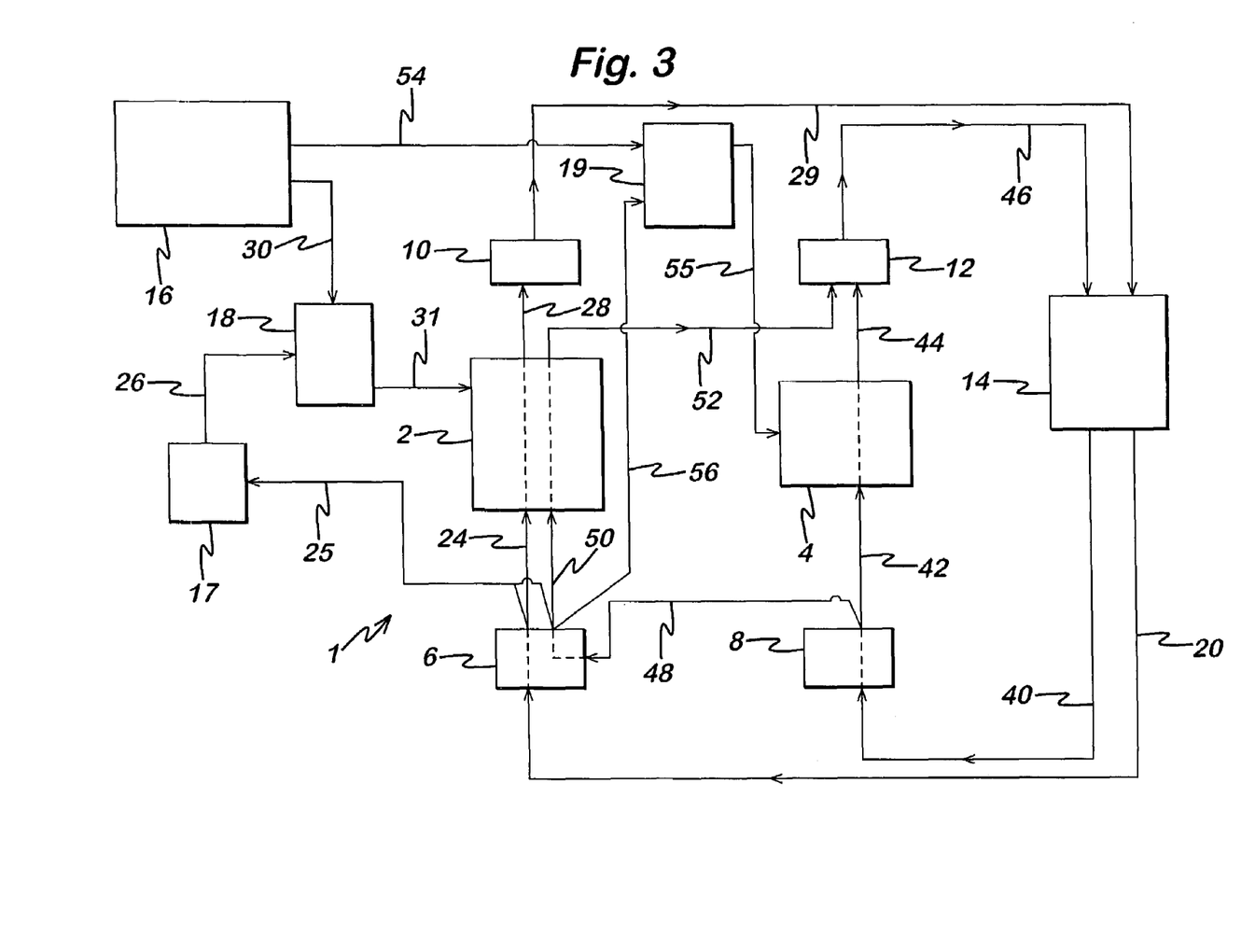
FIG. 3 is a schematic block diagram of another embodiment of the invention.
Figure 4:
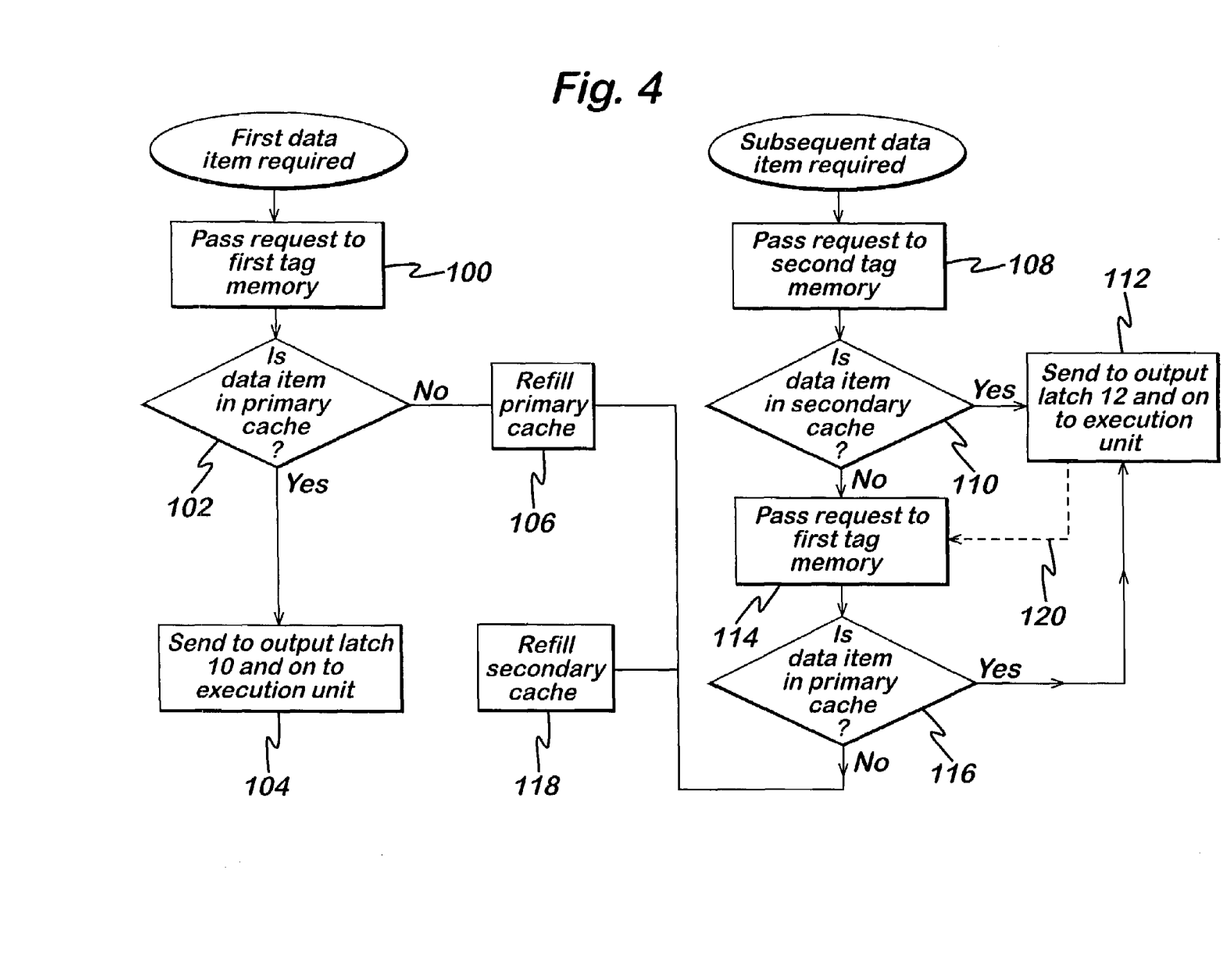
FIG. 4 is a flow chart showing steps involved in the embodiment shown in FIG. 3.

The refill of the secondary cache 4 is shown in FIG. 3 with an extra arrow 56 from the first tag memory 6 to the refill engine 19 associated with the secondary cache 4. The refill engine retrieves the item from the main memory 16 (arrow 54) and passes it to the secondary cache 4 (arrow 55).

It is not an absolute requirement that the primary cache memory 2 be refilled at the same time as the secondary cache memory 4. Furthermore, at any time that the primary cache 2 is to be refilled, any or all of the fetched items could be stored in the secondary cache 4 if desired.

The procedure for writing a tagged item to the primary cache 2 is the same as that described for writing in the first embodiment. However, due to the greater certainty of items being in a particular cache memory, in this embodiment writes can also be carried out with respect to non-tagged items by sending a request only to the primary cache 2 in accordance with step 100. If the item is found in the primary cache 2, instead of sending the item to the output latch 10 in accordance with step 104, the item is updated. If the item is not found in the primary cache 2 it can be written into the primary cache 2.

To improve efficiency, lines in the secondary cache could have a start and limit. For example, an access to address 0x00c41058 could cause a line in the secondary cache to begin being filled from address 0x00c41040 (rounded down to a 32 byte access). Burst accesses could then be made to fetch the rest of the line, i.e. up to address 0x00c41400.

It will be understood that the invention is not limited to the particular timings described in the embodiments, nor to the particularly described refill operations of the cache memories. The invention could be extended to cache systems with more than two cache memories. The invention may include any feature or combination of features disclosed herein either implicitly or explicitly or any generalisation thereof, irrespective of whether it relates to the presently claimed invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A cache memory system comprising:
   a first cache memory;
   a second cache memory;
   a first port arranged to receive a request for a first item and determine whether the first item is in the first cache memory;
   a second port arranged to receive a request for a second item and determine whether the second item is in the second cache memory, wherein the first port is arranged to receive one of tagged and untagged requests and the second port is further arranged to receive the other of tagged and untagged requests, wherein the request for the first item and the request for second item can be simultaneously received at the first port and the second port, respectively, and the second port is arranged to determine whether the second item is in the second cache memory while the first port is determining whether the first item is in the first cache memory, and wherein the cache memory system is arranged such that if the second item is determined not to be in the second cache memory, a request for the second item is sent to the first port; and a third port associated with the second cache memory and arranged to receive the request for the first item and to determine whether the first item is in the second cache memory, wherein the first and third ports are arranged such that they can receive the request for the first item substantially simultaneously.

2. A cache memory system according to claim 1, wherein the first and third ports are arranged to receive the said request for the first item substantially simultaneously.

3. A cache memory system according to claim 1, arranged such that the request for the second item is sent to the first port during the clock cycle following determination that the second item is not in the second cache memory.

4. A cache memory system according to claim 1, wherein the first port is arranged such that upon receipt of the said request for the second item, the first port determines whether the second item requested in the said request is in the first cache memory.

5. A cache memory system according to claim 1, wherein the first port is a read-write port.

6. A cache memory system according to claim 1, wherein the second port is a read-only port.

7. A cache memory system according to claim 1, wherein the first port comprises a first tag memory arranged to look for items in the first cache memory.

8. A cache memory system according to claim 1, wherein the second port comprises a second tag memory arranged to look for items in the second cache memory.

9. A cache memory system according to claim 1, further comprising a first output latch, and wherein the system is arranged such that if a read request for an item is directed to the first port and the item is determined to be in one of the first and second cache memories, the item is sent to the first output latch.

10. A cache memory system according to claim 1, further comprising a second output latch and wherein the system is arranged such that if a read request for an item is directed to the second port and the item is determined to be in one of the first and second cache memories, the item is sent to the second output latch.

11. A cache memory system according to claim 1, wherein the first cache memory is refillable from a main memory associated with the system.

12. A cache memory system according to claim 1, wherein the second cache memory is refillable from the first cache memory.

13. A cache memory system according to claim 12, further comprising a fetch engine associated with the first cache memory and arranged to fetch a first item from a main memory and to pre-fetch other items together with the said first item and pass the said first item and the other items to the first cache memory.

14. A cache memory system according to claim 13, wherein the first cache memory is arranged to refill the second cache memory with the other items.

15. A cache memory according to claim 14, arranged such that the first cache memory is arranged to refill the second cache memory when the said first item is determined to be in the first cache memory.

16. A cache memory system according to claim 13, wherein the fetch engine is arranged to fetch the said first item from the main memory and to pre-fetch other items for refilling the first cache memory, when the said first item is not found in the first cache memory.

17. A cache memory system according to claim 13, wherein the other items are stored adjacent to the said first item in the main memory.

18. A cache memory system according to claim 1, wherein the second cache memory is refillable from a main memory associated with the system.

19. A cache memory system according to claim 18, further comprising:
a first fetch engine associated with the first cache memory and arranged to fetch a first item from a main memory and pass it to the first cache memory; and
a second fetch engine associated with the second cache memory and arranged to fetch other items from the main memory and pass them to the second cache memory.

20. A cache memory system according to claim 19, wherein the other items are stored adjacent to the said item in the main memory.

21. A cache memory system according to claim 19, wherein the first fetch engine is arranged to fetch the said first item from the main memory when the said first item is not found in the first cache memory.

22. A cache memory system according to claim 19, wherein the second fetch engine is arranged to fetch one or more of the said other items when one of the said other items is not found in the first cache memory.

23. A cache memory system according to claim 1, arranged such that upon receipt at the second port of a write request for an item, if the item is determined to be in the second cache memory, the item is deleted.

24. A cache memory system according to claim 23, further arranged such that independent of whether the item is determined to be in the second cache memory, the request is sent to the first port to determine whether the item is in the first cache memory.

25. A cache memory system according to claim 24, arranged such that if the item is determined to be in the first cache memory, the item is updated in accordance with the request.

26. A cache memory system according to claim 24, arranged such that if the item is determined not to be in the first cache memory, the item is written to the first cache memory.

27. A cache memory system comprising:
a first cache memory;
a second cache memory;
a first port arranged to receive a request for a first item and determine whether the first item is in the first cache memory;
a second port arranged to receive a request for a second item and determine whether the second item is in the second cache memory, wherein the first port is arranged to receive one of tagged and untagged requests and the second port is further arranged to receive the other of tagged and untagged requests, and wherein the cache memory system is arranged such that if the second item is determined not to be in the second cache memory, a request for the second item is sent to the first port; and
a third port associated with the second cache memory and arranged to receive the request for the first item and to determine whether the first item is in the second cache memory, wherein the first and third ports are arranged such that they can receive the request for the first item substantially simultaneously.

28. A method of accessing multiple items from a memory which has associated with it a first cache memory having a first port and a second cache memory having a second port and a third port, the method comprising:
receiving a request for a first item at the first port;
determining whether the first item is in the first cache memory;
receiving the request for the first item at the third port associated with the second cache memory;
determining, using the third port, whether the first item is in the second cache memory, wherein the first and third ports are arranged to receive the said request for the first item substantially simultaneously;
receiving a request for a second item at the second port;
determining, using the second port, whether the second item is in the second cache memory; and
if the second item is determined not to be in the second cache memory, sending a request for the second item to the first port, wherein the request for the first item and the request for second item can be simultaneously received at the first port and the second port, respectively, and the second port is arranged to determine whether the second item is in the second cache memory while the first port is determining whether the first item is in the first cache memory; and wherein the first port is arranged to receive one of tagged and untagged requests and the second port is further arranged to receive the other of tagged and untagged requests.

29. A cache memory system comprising:
a first cache memory;
a second cache memory;
a first port arranged to receive a request for a first item and determine whether the first item is in the first cache memory; and
a second port arranged to receive a request for a second item and determine whether the second item is in the second cache memory, wherein the first port is arranged to receive one of tagged and untagged requests and the second port is further arranged to receive the other of tagged and untagged requests, and wherein the request for the first item and the request for second item can be simultaneously received at the first port and the second port, respectively, and the second port is arranged to determine whether the second item is in the second cache memory while the first port is determining whether the first item is in the first cache memory, and wherein the cache memory system is arranged such that if the second item is determined not to be in the second cache memory, a request for the second item is sent to the first port.

30. A cache memory system according to claim 29, further comprising a third port associated with the second cache memory and wherein the third port is further arranged to receive the said request for the first item and to determine whether the said first item is in the second cache memory.

31. A cache memory system according to claim 30, wherein the first and third ports are arranged to receive the said request for the first item substantially simultaneously.

32. A cache memory system according to claim 29, arranged such that the request for the second item is sent to the first port during the clock cycle following determination that the second item is not in the second cache memory.

33. A cache memory system according to claim 29, wherein the first port is arranged such that upon receipt of the said request for the second item, the first port determines whether the second item requested in the said request is in the first cache memory.

34. A cache memory system according to claim 29, wherein the first port is a read-write port.

35. A cache memory system according to claim 29, wherein the second port is a read-only port.

36. A cache memory system according to claim 29, wherein the first port comprises a first tag memory arranged to look for items in the first cache memory.

37. A cache memory system according to claim 29, wherein the second port comprises a second tag memory arranged to look for items in the second cache memory.

38. A cache memory system according to claim 29, further comprising a first output latch, and wherein the system is arranged such that if a read request for an item is directed to the first port and the item is determined to be in one of the first and second cache memories, the item is sent to the first output latch.

39. A cache memory system according to claim 29, further comprising a second output latch and wherein the system is arranged such that if a read request for an item is directed to the second port and the item is determined to be in one of the first and second cache memories, the item is sent to the second output latch.

40. A cache memory system according to claim 29, wherein the first cache memory is refillable from a main memory associated with the system.

41. A cache memory system according to claim 29, wherein the second cache memory is refillable from the first cache memory.

42. A cache memory system according to claim 41, further comprising a fetch engine associated with the first cache memory and arranged to fetch a first item from a main memory and to pre-fetch other items together with the said first item and pass the said first item and the other items to the first cache memory.

43. A cache memory system according to claim 42, wherein the first cache memory is arranged to refill the second cache memory with the other items.

44. A cache memory according to claim 43, arranged such that the first cache memory is arranged to refill the second cache memory when the said first item is determined to be in the first cache memory.

45. A cache memory system according to claim 42, wherein the fetch engine is arranged to fetch the said first item from the main memory and to pre-fetch other items for refilling the first cache memory, when the said first item is not found in the first cache memory.

46. A cache memory system according to claim 42, wherein the other items are stored adjacent to the said first item in the main memory.

47. A cache memory system according to claim 29, wherein the second cache memory is refillable from a main memory associated with the system.

48. A cache memory system according to claim 29, arranged such that upon receipt at the second port of a write request for an item, if the item is determined to be in the second cache memory, the item is deleted.

49. A cache memory system according to claim 48, further arranged such that independent of whether the item is determined to be in the second cache memory, the request is sent to the first port to determine whether the item is in the first cache memory.

50. A cache memory system according to claim 49, arranged such that if the item is determined to be in the first cache memory, the item is updated in accordance with the request.

51. A cache memory system according to claim 49, arranged such that if the item is determined not to be in the first cache memory, the item is written to the first cache memory.

52. A method of accessing multiple items from a memory which has associated with it a first cache memory having a first port and a second cache memory having a second port and a third port, the method comprising:

receiving a request for a first item at the first port;

determining whether the first item is in the first cache memory;

receiving the request for the first item at the third port associated with the second cache memory;

determining, using the third port, whether the first item is in the second cache memory, wherein the first and third ports are arranged to receive the said request for the first item substantially simultaneously;

receiving a request for a second item at the second port;

determining, using the second port, whether the second item is in the second cache memory; and if the second item is determined not to be in the second cache memory, sending a request for the second item to the first port, wherein the request for the first item and the request for second item can be simultaneously received at the first port and the second port, respectively, and the second port is arranged to determine whether the second item is in the second cache memory while the first port is determining whether the first item is in the first cache memory; and wherein the first port is arranged to receive one of tagged and untagged requests and the second port is further arranged to receive the other of tagged and untagged requests.

* * * * *

UNITED STATES PATENT AND TRADEMARK OFFICE
CERTIFICATE OF CORRECTION

PATENT NO.       : 7,373,458 B2                                          Page 1 of 1
APPLICATION NO.  : 10/864916
DATED            : May 13, 2008
INVENTOR(S)      : Mark O. Homewood It is certified that error appears in the above-identified patent and that said Letters Patent is hereby corrected as shown below:

On the Title Page:
Item (73) should read:
(73) Assignee: STMicroelectronics Limited, Almondsbury Bristol, United Kingdom Signed and Sealed this Seventh Day of April, 2009

JOHN DOLL
*Acting Director of the United States Patent and Trademark Office*